(12) United States Patent
Dietzel

(10) Patent No.: US 10,352,387 B2
(45) Date of Patent: Jul. 16, 2019

(54) HELICAL SPRING CONNECTION

(71) Applicant: Brose Fahrzeugteile GmbH & Co. KG, Hallstadt, Hallstadt (DE)

(72) Inventor: Renee Dietzel, Sonnefeld (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 92 days.

(21) Appl. No.: 14/915,768

(22) PCT Filed: Sep. 2, 2014

(86) PCT No.: PCT/EP2014/068627
§ 371 (c)(1),
(2) Date: Mar. 1, 2016

(87) PCT Pub. No.: WO2015/032760
PCT Pub. Date: Mar. 12, 2015

(65) Prior Publication Data
US 2016/0208877 A1    Jul. 21, 2016

(30) Foreign Application Priority Data
Sep. 3, 2013   (DE) .................. 10 2013 109 613

(51) Int. Cl.
*F16F 1/12* (2006.01)
*B62D 25/12* (2006.01)
(Continued)

(52) U.S. Cl.
CPC ............ *F16F 1/125* (2013.01); *B62D 25/105* (2013.01); *B62D 25/12* (2013.01); *E05F 1/10* (2013.01); *F16F 1/121* (2013.01); *F16F 1/122* (2013.01)

(58) Field of Classification Search
CPC ...... B62D 25/10; B62D 25/105; B62D 25/12; E05F 1/10; E05F 1/1025; F16F 1/12; F16F 1/122; F16F 1/125
(Continued)

(56) References Cited

U.S. PATENT DOCUMENTS 1,428,740 A * 9/1922 Akimoff .................. F16F 1/125
                                                      267/286
2,661,206 A   12/1953 Gregoire
(Continued)

FOREIGN PATENT DOCUMENTS

CH           336633 A  *  2/1959  .............. F16F 1/125
DE           923950        2/1955
(Continued)

OTHER PUBLICATIONS

English translation of CH336633; retreived Apr. 30, 2018 via PatentTranslate loacated at www.epo.org. (Year: 2018).*
(Continued)

*Primary Examiner* — Jason S Daniels
(74) *Attorney, Agent, or Firm* — Pauly, DeVries Smith & Deffner LLC

(57) ABSTRACT

The invention relates to a coil spring connector for connecting in a force-transmitting manner a coil tension spring of a motor vehicle. It is proposed that a base part for outward transmission of the spring force of the coil tension spring and a sleeve-type adapter part for fitting between the base part and a coil spring interior are provided.

20 Claims, 5 Drawing Sheets

(51) Int. Cl.
*E05F 1/10* (2006.01)
*B62D 25/10* (2006.01)

(58) Field of Classification Search
USPC .......................................................... 296/76
See application file for complete search history.

(56) References Cited

U.S. PATENT DOCUMENTS

| | | | | |
|---|---|---|---|---|
| 4,776,626 | A * | 10/1988 | Seyler | E05D 5/062 |
| | | | | 16/289 |
| 6,375,171 | B1 * | 4/2002 | Zimmermann | B25F 5/006 |
| | | | | 267/137 |
| 2011/0204550 | A1 * | 8/2011 | Pepka | F16F 1/125 |
| | | | | 267/168 |

FOREIGN PATENT DOCUMENTS

| | | |
|---|---|---|
| DE | 3723449 | 1/1989 |
| DE | 297216 | 1/1992 |
| DE | 19914786 | 6/2000 |
| DE | 10236137 | 2/2004 |
| DE | 102005046268 | 3/2007 |
| DE | 102007011325 | 9/2008 |
| DE | 102011109262 | 2/2013 |
| EP | 0663307 | 7/1995 |
| EP | 1645772 | 4/2006 |

OTHER PUBLICATIONS

"German Search Report," for German Patent Application No. 10201310961.1, which is a priority application for U.S. Appl. No. 14/915,768, dated Mar. 7, 2014 (5 pages).

"International Prelminary Report on Patentability," for PCT/EP2014/068627, which is a priority application for U.S. Appl. No. 14/915,768, dated Mar. 17, 2016 (14 pages).

"International Search Report and Written Opinion," for PCT/EP2014/068627, which is a priority application for U.S. Appl. No. 14/915,768, dated Jan. 26, 2016 (15 pages).

* cited by examiner

HELICAL SPRING CONNECTION

CROSS-REFERENCE TO RELATED APPLICATIONS

This application is a national stage application under 35 U.S.C. 371 of Inter-national Patent Application Serial No. PCT/EP2014/068627, entitled "Schraubenfederanschluss," filed Sep. 2, 2014, which claims priority from German Patent Application No. DE 10 2013 109 613.1, filed Sep. 3, 2013, the disclosures of which are incorporated herein by reference.

FIELD OF THE TECHNOLOGY

The document relates to a coil spring connector for connecting in a force-transmitting manner a coil tension spring of a motor vehicle, a coil spring assembly of a motor vehicle, a lid assembly of a motor vehicle, and to a method for fitting a coil spring assembly.

BACKGROUND

The coil tension springs in question are employed in a variety of regions of a motor vehicle. One example thereof is supporting the opening motion or the closing motion of the lid of a motor vehicle. The term "lid" here is to be understood in a comprehensive manner. It includes deck lids, tailgates, engine bay lids, doors, in particular lateral doors, cargo space floors or the like of a motor vehicle. While the priority presently lies in the adjustment of a deck lid, this not to be understood as being limiting.

A coil tension spring which is assigned to a deck lid is demonstrated in DE 199 14 786 A1. The coil tension spring is articulated on a lid component, namely a swing arm, on the one hand, and on the other hand is fixedly articulated on the body. For the coil tension spring to be connected in a force-transmitting manner the in each case last spring turn on both coil spring ends is bent to form a hook. In terms of production technology this is complex and allows only limited flexibility in the design of the spring, in particular when standard springs are to be used.

Another known possibility for a coil tension spring to be connected in a force-fitting manner lies in screwing a threaded plug into the coil tension spring at both ends. In this way, the threaded plug is engaged in a form-fitting manner with the coil spring interior such that the spring force of the coil tension spring may be transmitted outward. This is demonstrated in the European Standard EN 13906, image A.11. In the case of the threaded plug the fact that the threaded plug is conceived for one and the same coil diameter is disadvantageous. Tolerances in the coil diameter here may lead to the retaining effect between the threaded plug and the coil tension spring being limited. Accordingly, when the known threaded plug is used it is also not possible for coil tension springs having dissimilar coil diameters to be applied.

SUMMARY

The invention is based on the object of designing and refining the known coil spring connector in such a manner that the flexibility in terms of the coil diameter of the coil tension spring to be connected is further enhanced.

The above-mentioned object is achieved by a coil spring connector as described herein.

The fundamental concept of designing the coil spring connector so as to be in at least two parts in order for adaptability of the coil spring connector to various coil diameters of the coil tension spring to be connected to be enabled is essential. In detail, a base part for outward transmission of the spring force of the coil tension spring, and a sleeve-type adapter part for fitting between the base part and a coil spring interior are provided.

By way of the design embodiment of the coil spring connector in at least two parts, adaptability to dissimilar coil diameters is conceivable in various ways.

In an embodiment, relative adjustment between the base part and the adapter part causes expansion of the adapter part. The cause thereof may be a length adjustment of the adapter part on the base part.

In various embodiments, the base part and/or the adapter part are equipped with at least one expansion portion which takes care of the above-mentioned expansion of the adapter part. The at least one expansion portion is designed such that on account of relative adjustment as mentioned above, the base part by way of the expansion portion is brought to engage with the adapter part in such a manner that said base part urges the adapter part outward.

Various embodiments relate to variants for securing the adapter part to the base part. In terms of fitting techniques in which the adapter part for fitting is screw-fittable onto the base part, is of a particularly simple design.

The above-described adaptability of the coil spring connector to dissimilar coil diameters by way of relative adjustment between the base part and the adapter part may be implemented in a particularly cost-effective manner, since a multiplicity of adjustment possibilities are implementable by way of only two components, namely the base part and the adapter part.

Another possibility for adapting the coil spring connector to dissimilar coil diameters lies in that dissimilar adapter pieces which in each case have a dissimilar geometry which is adapted to the respective coil diameter are available. Depending on the desired coil diameter, the corresponding adapter part is to be applied. This here in a certain sense is a modular kit in which a base part is combinable with a multiplicity of adapter pieces.

A further-reaching possibility for adapting the coil spring connector to dissimilar coil diameters is provided according to an embodiment in that at least one further adapter part is provided for disposal between the adapter part and the coil spring interior of the coil tension spring. In this way, adapting the coil spring connector to dissimilar coil diameters may be performed in that a predetermined number of adapter parts are disposed between the base part and the coil spring interior. In principle, the further adapter part may have the same construction as the above-described adapter part, so that reference to this extent may be made to the respective explanations.

According to an embodiment, a coil spring assembly having a coil tension spring and at least one coil spring connector according to the proposal, which is fitted to the coil tension spring. In some embodiments, in each case one coil spring connector is fitted to both coil spring ends. Reference may be made to all embodiments of the coil spring connector according to the proposal.

According to an embodiment, a lid assembly of a motor vehicle, having a lid and a coil spring assembly according to the proposal, assigned to the lid. It has been established that by way of a coil spring connector according to the proposal not only easy adaptability but also high ruggedness in terms of the rough environmental conditions prevailing in the case of motor vehicles may be achieved. This relates in particular to temperature variations which are associated with corresponding changes in the coil diameter, and to vibrations which at all times require optimal engagement between the coil spring connector and the assigned coil tension spring.

An embodiment provides a method for fitting a coil spring assembly according to the proposal.

According to the further teaching it is essential that initially the adapter part is fitted to the coil spring interior, and that subsequently the adapter part together with the coil tension spring is fitted to the base part, expanding the adapter part. In the case of this fitting method the fact that not only optimal adaptation to the coil diameter of the coil tension spring is guaranteed but that by fitting also a force-fit between the coil spring connector and the coil tension spring is created is advantageous, this further enhancing the retention effect and in particular ruggedness in relation to deviations in the coil diameter.

In terms of further details pertaining to the method according to the proposal, reference may be made to the explanations pertaining to the coil spring connector according to the proposal.

An embodiment provides a coil spring connector for connecting in a force-transmitting manner a coil tension spring of a motor vehicle, wherein a base part for outward transmission of the spring force of the coil tension spring and a sleeve-type adapter part for fitting between the base part and a coil spring interior are provided.

In an embodiment, the base part has a pin-type receptacle portion, and wherein the adapter part is fittable onto the pin-type receptacle portion of the base part, in particular for fitting onto the pin-type receptacle portion of the base part, is length-adjustable in particular by way of a screwing motion or a displacing motion.

In an embodiment, by way of relative adjustment, in particular by length adjustment, between the base part and the adapter part the base part is capable of engagement with the adapter part in such a manner that the adapter part is expanded.

In an embodiment, the base part on the external side thereof, and/or the adapter part on the interior thereof, have or has, respectively, at least one in particular conical expansion portion, and wherein the engagement of an expansion portion of one of the two parts in the respective other part causes expansion of the adapter part, such as wherein the pin-type portion of the base part on the front end thereof and/or on the rear end thereof in relation to the fitting direction of the adapter part has an in particular conical expansion portion or in particular conical expansion portions, respectively, and/or wherein the adapter part at the front end thereof and/or at the rear end thereof in relation to the fitting direction of the adapter part has an in particular conical expansion portion or in particular conical expansion portions, respectively.

In an embodiment, an external side of the base part, in particular a pin-type receptacle portion of the base part, and/or an interior of the adapter part are or is configured so as to be overall conical, respectively.

In an embodiment, the adapter part for expandability thereof has a material weakening, such as at least one slot or at least one elongate slot.

In an embodiment, the adapter part for fitting is connectable to the base part in a form-fitting manner, in particular is screw-fittable onto the base part, such as wherein the base part to this end has an external thread and/or the adapter part have or has an internal thread, respectively.

In an embodiment, the adapter part for fitting onto the base part is push-fittable, in particular press-fittable along the sleeve longitudinal axis.

In an embodiment, the base part has at least part, in particular one turn, of an external thread for engaging in a form-fitting manner with at least one spring turn of the coil tension spring, and/or the adapter part has an external thread for engaging in a form-fitting manner with at least one spring turn of the coil tension spring, such as wherein the adapter part for fitting is screw-finable into the coil tension spring.

In an embodiment, the adapter part for fitting is connectable in a form-fitting latching manner to the base part, such as wherein the adapter part has at least one latching element, such as an in particular encircling latching web, and the base part has at least one latching counterpart, such as an in particular encircling groove, and wherein upon fitting of the adapter part, in particular by way of length adjustment, a latching connection between the adapter part and the base part by way of the latching element and the latching counterpart is established, such as wherein at least two latching elements are disposed on the adapter part and/or at least two latching counterparts are disposed on the base part.

In an embodiment, the base part is designed from another material than the adapter part, such as the base part is designed from a harder material than the adapter part.

In an embodiment, at least one further adapter part is provided for disposal between the adapter part and the coil spring interior of the coil tension spring.

An embodiment provides a coil spring assembly of a motor vehicle, having a coil tension spring and at least one coil spring connector as described herein, which is fitted to the coil tension spring.

An embodiment provides a lid assembly of a motor vehicle, having a lid, in particular a deck lid, and a coil spring assembly as described herein, assigned to the lid.

In an embodiment, initially the adapter part is fitted to the coil spring interior, and wherein subsequently the adapter part is fitted to the base part, expanding the adapter part.

BRIEF DESCRIPTION OF THE FIGURES

The invention will be explained in more detail hereunder by means of a drawing which merely illustrates one exemplary embodiment. In the drawing.

DETAILED DESCRIPTION

Figure 1:
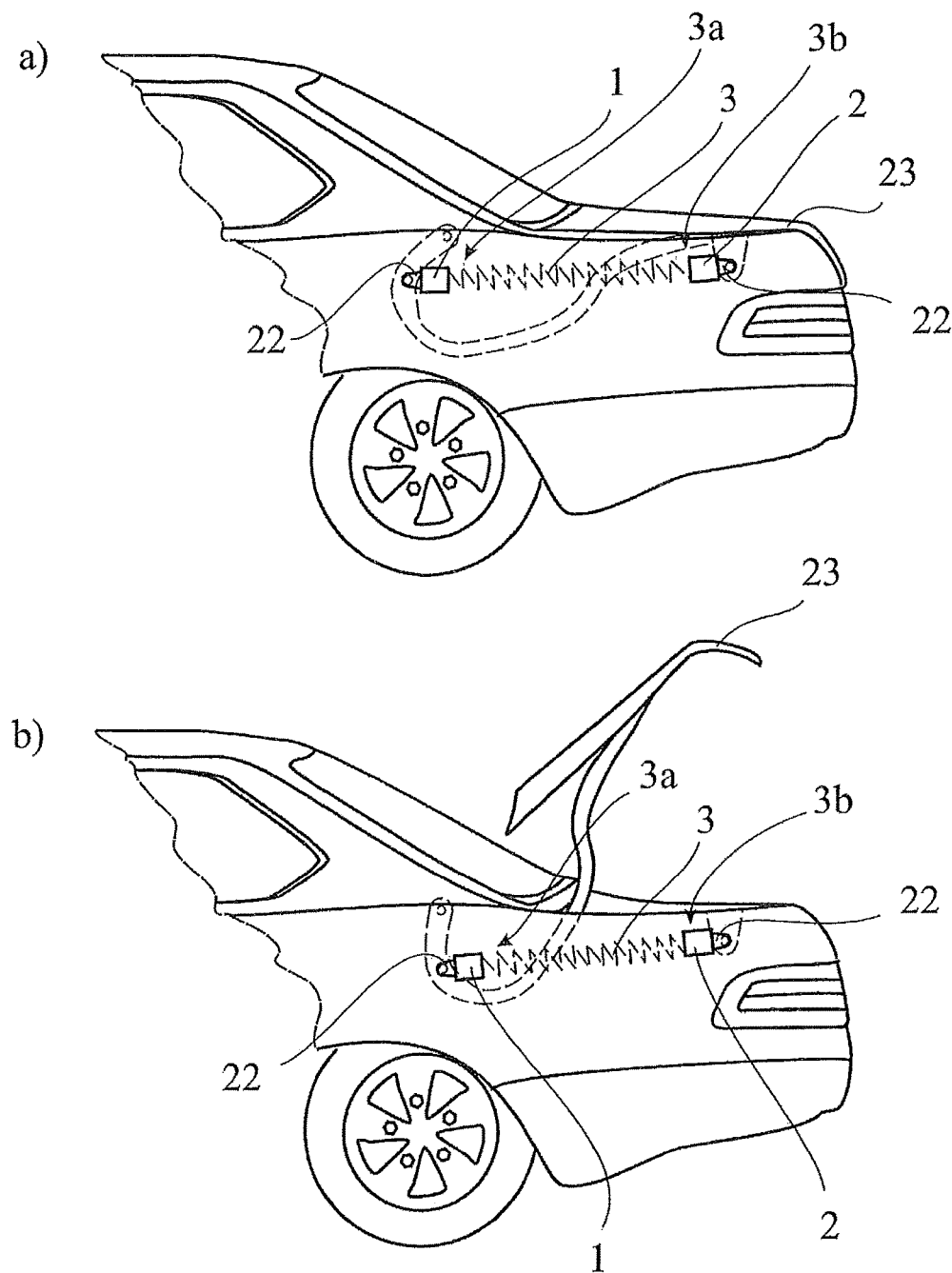
FIG. 1 shows the rear region of a motor vehicle, having a deck lid assembly according to the proposal, which is assigned a coil spring assembly according to the proposal, having two coil spring connectors according to the proposal at the end sides.

The coil spring connector 1, 2 according to the proposal may be applied in various regions of a motor vehicle. The coil spring connector 1, 2 is presently assigned to a deck lid assembly of a motor vehicle. All explanations pertaining to this coil spring connector 1, 2 apply in a corresponding manner to all other fields of application.

In a very general sense, the proposed coil spring connector 1, 2 serves for connecting in a force-transmitting manner a coil tension spring 3 of a motor vehicle. In the exemplary embodiment illustrated in FIG. 1, the coil tension spring 3 facilitates the opening procedure of the deck lid assembly. A coil spring connector 1, 2 according to the proposal is disposed on both coil spring ends 3a, 3b.

The coil spring connector 1, 2 is equipped with a base part 4 for outward transmission of the spring force of the coil tension spring 3, and with a sleeve-type adapter part 5 for fitting between the base part 4 and a coil spring interior 6. This may best be derived from the illustration of the first exemplary embodiment according to FIG. 2. For the sake of clarity in the illustrations, only part of the coil tension spring 3 is illustrated in the case of all exemplary embodiments. The sleeve-type adapter part 5 extends along a longitudinal sleeve axis 7.

In the case of all illustrated exemplary embodiments the base part 4 furthermore has a pin-type receptacle portion 4a, the adapter part 5 being fittable onto the pin-type receptacle portion 4a of the base part 4. Viewed together, it can be derived from FIGS. 2a-d, in particular from FIGS. 2c, d, that the adapter part 5 in particular for fitting onto the pin-type receptacle portion 4a of the base part 4 is length-adjustable. Depending on the exemplary embodiment, length adjustment may be performed by a screwing motion or by a displacing motion, as will still be explained.

An embodiment provides the possibility for adapting the coil spring connector 1, 2 to dissimilar coil diameters can be traced back to relative adjustment between the base part 4 and the adapter part 5. Here it is such that by way of relative adjustment, in particular by length adjustment, between the base part 4 and the adapter part 5 the base part 4 is capable of being brought into engagement with the adapter part 5 in such a manner that the adapter part 5 is expanded.

The term "length adjustment" in the present case refers at all times to the longitudinal sleeve axis 7. "Expanding" is to be understood that the adapter part 5 in relation to the longitudinal sleeve axis 7 is urged radially outward. The transition from FIG. 2c to FIG. 2d shows particularly clearly the expansion of the adapter part 5.

It may be noted that the expansion of the adapter part 5 in the case of the illustrated exemplary embodiment is accompanied by an increase in the diameter of the adapter part 5 of at maximum 0.5 mm. In this way, production tolerances in the coil diameter of the coil tension spring 3 may be particularly well compensated. In the case of a suitable geometry of the base part 4 and of the adapter part 5, higher values for the maximum increase in diameter may be achieved.

In order for expansion of the adapter part 5 to be established by length adjustment of the adapter part 5 on the base part 4, it is provided that the base part 4 and/or the adapter part 5 by way of the mutually facing engagement faces thereof deviate from ideal cylinder sleeve faces. In a very general sense it is proposed to this end that the base part 4 on the external side thereof and/or the adapter part 5 on the interior thereof have or has, respectively, at least one expansion portion 8-12, wherein the engagement of an expansion portion 8-12 of one of the two parts 4, 5 in the respective other part 4, 5 causes expansion of the adapter part 5.

Figure 3:
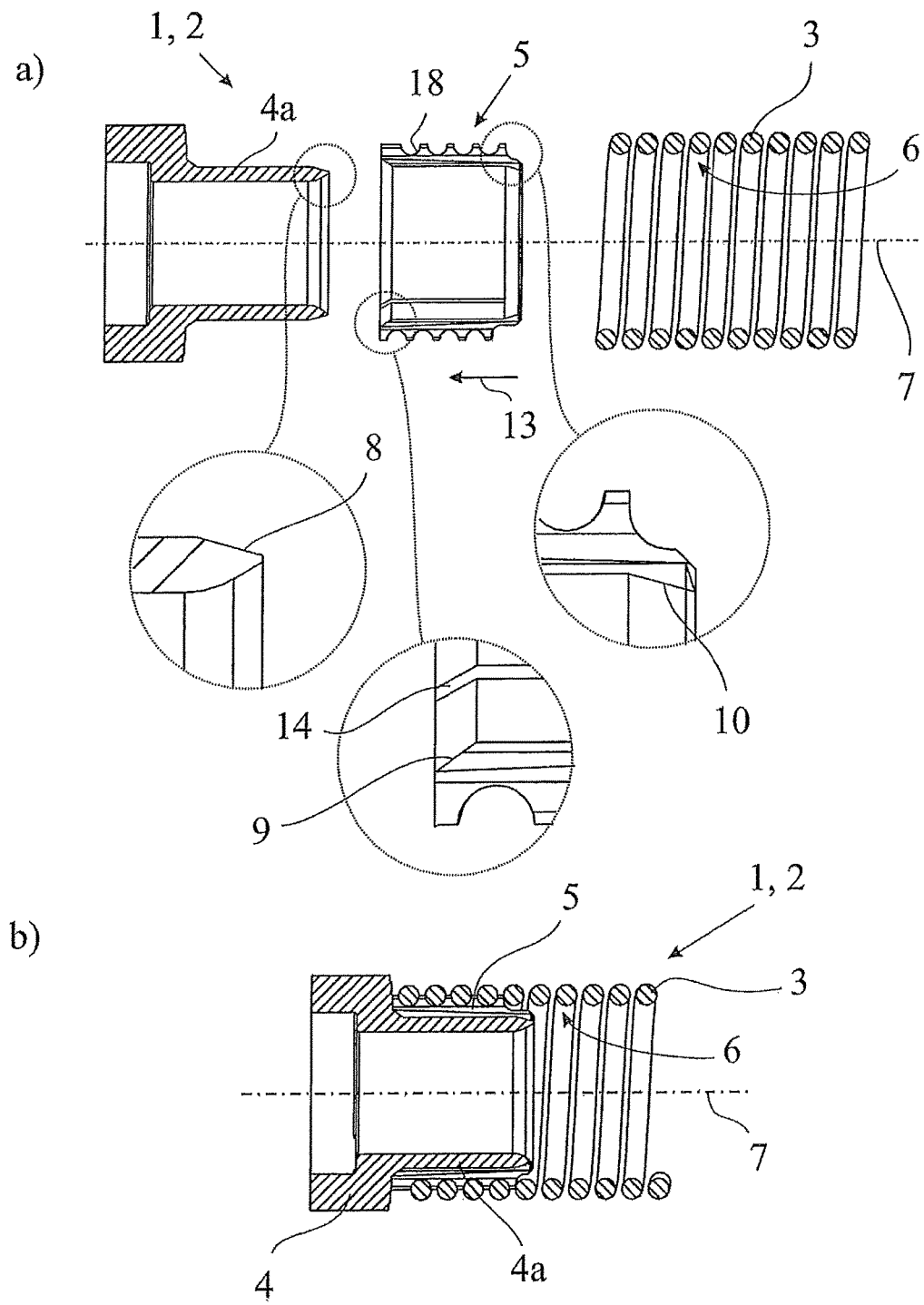
FIG. 3 shows a coil spring connector according to FIG. 1, in a further embodiment a) in a non-fitted state, in a longitudinal section, and b) following a second fitting step, in the longitudinal section.

FIG. 3 shows an example of the above-mentioned assembly of a plurality of expansion portions 8-10. Here, the pin-type portion 4a of the base part 4 on the front end thereof and on the rear end thereof in relation to the fitting direction 13 of the adapter part 5 has corresponding expansion portions 9, 10. In principle and depending on the specific application, the expansion portions 8-12 may be disposed in a largely arbitrary manner. For example, expansion portions may be provided both at the front end as well as at the rear end of the base part 4, or else only at one of the two ends of the base part 4. The same applies to the adapter part 5.

Numerous advantageous variants are conceivable for the shape of the expansion portions 8-12. In an embodiment, at least part of the expansion portions 8-12 are of conical design. Here, all expansion portions 8-12 are conical expansion portions 8-12. However, it is also conceivable that the expansion portions 8-12 are the result of individual and ramp-type moldings, of web-type moldings or the like on the base part 4 and/or on the adapter part 5.

Figure 2:
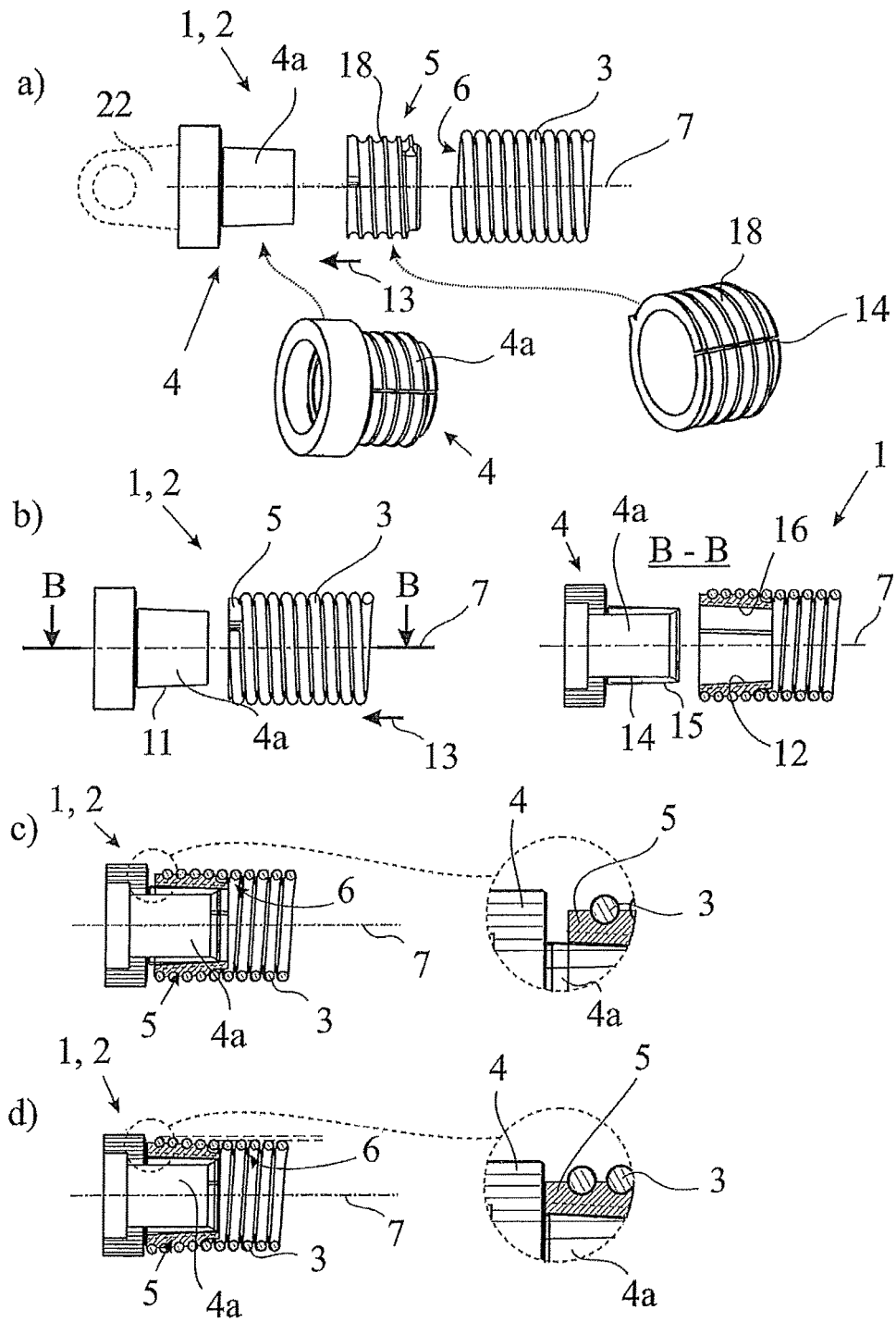
FIG. 2 shows a coil spring connector according to FIG. 1, in a first embodiment a) in a non-fitted side view, b) following a first fitting step, in a side view and in a longitudinal section, c) following a second fitting step, in the longitudinal section in a first expanded position, and d) following a second fitting step, in a longitudinal section in a second expanded position.
Figure 4:
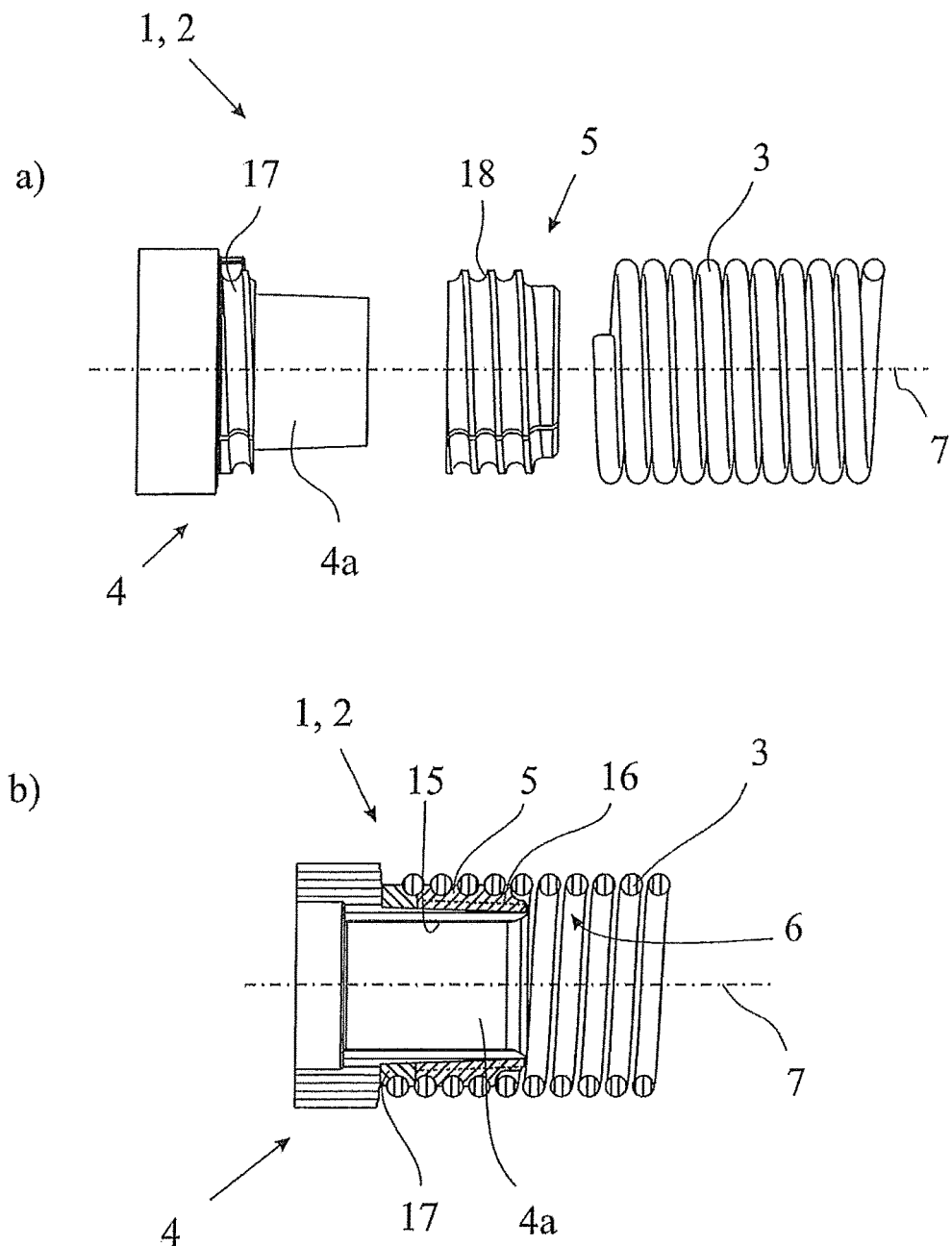
FIG. 4 shows a coil spring connector according to FIG. 1, in a further embodiment a) in the non-fitted state, in a side view, and b) following a second fitting step in the longitudinal section.

In the case of the exemplary embodiments which are illustrated in FIGS. 2 and 4, an external side of the base part 4, presently the pin-type receptacle portion 4a of the base part 4, is configured so as to be overall conical such that the pin-type receptacle portion 4a per se provides an expansion portion 11. Alternatively or additionally, similar may be provided for the adapter part 5. In the exemplary embodiment illustrated in FIG. 2, the interior of the adapter part 5 is configured so as to be overall conical such that the adapter part 5 per se provides an expansion portion 12.

In order to allow expandability of the adapter part 5, it may be provided that the adapter part 5 is configured from a correspondingly elastic material. However, presently the adapter part 5 for expandability thereof has a material weakening. In detail the adapter part 5 here is equipped with a slot 14, furthermore with an elongate slot 14 which substantially extends along the longitudinal sleeve axis 7 and in some embodiments along the entire length of the adapter part 5. This can be derived from the perspective illustration of the adapter part 5 in FIG. 2a. In principle, a plurality of slots 14 or the like may be provided.

The adapter part 5 can be secured to the base part 4. In the case of the embodiment illustrated in FIG. 2, the adapter part 5 to this end for fitting is screw-fittable onto the base part 4. Accordingly, the base part 4 is equipped with an external thread 15 and the adapter part 5 is equipped with a corresponding internal thread 16. In principle, it may suffice for only one of the two parts 4, 5 to be equipped with a thread if and when the respective other part has a corresponding entrainment element or the like. On account of the conicity of the base part 4 and of the adapter part 5, the threads 15, 16 shown in FIGS. 2 and 4 are in each case a conical thread.

Figure 5:
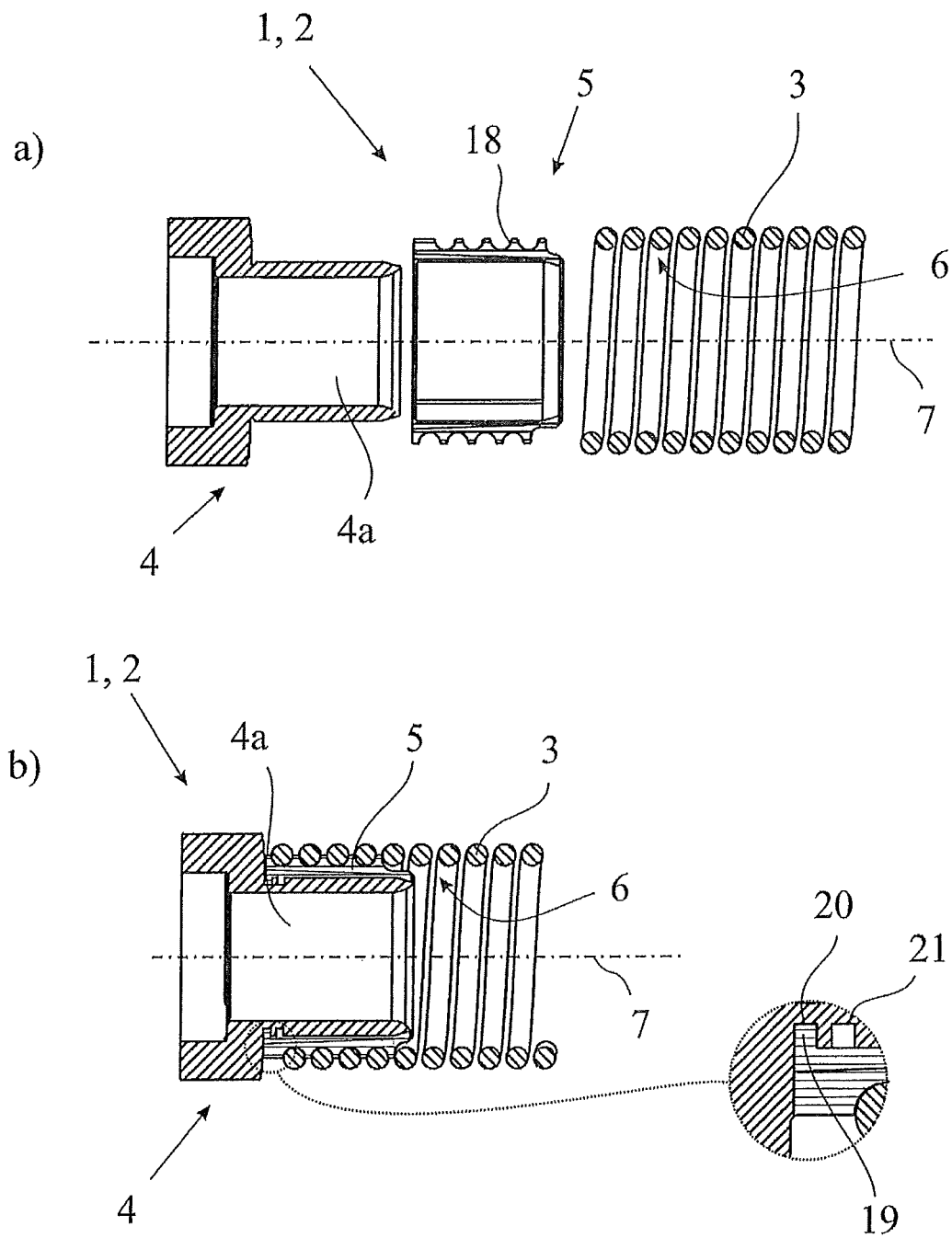
FIG. 5 shows a coil spring connector according to FIG. 1, in a further embodiment a) in the non-fitted state, in a longitudinal section, and b) following a second fitting step, in the longitudinal section.

In the case of the exemplary embodiments which are illustrated in FIGS. 3 to 5, the adapter part 5 for fitting onto the base part 4 is push-fittable along the longitudinal sleeve axis 7. In the case of the exemplary embodiment illustrated in FIG. 3, the adapter part 5 together with the coil tension spring 3 is press-fitted onto the base part 4. A press-fit thus results between the base part 4 and the adapter part 5.

In the embodiment according to FIG. 4 the base part 4 has at least part, presently one turn, of an external thread 17 for engaging in a form-fitting manner with at least one spring turn of the coil tension spring 3. On account thereof, at least part of the spring force of the coil tension spring 3 may be transmitted directly to the base part 4. In an embodiment, the adapter part 5 is additionally screw-fitted onto the base part 4 such that the spring force is transmitted in a corresponding manner to the base part 4 also to this extent.

Linking the adapter part 5 with the coil spring interior 6 is of very particular significance for the solution according to the proposal. In an embodiment, the adapter part 5 has an external thread 18 for the form-fitting engagement with at least one spring turn of the coil tension spring 3, on account of which the adapter part 5 for fitting is screw-fittable into the coil tension spring 3. This capability of the adapter part 5 for screw-fitting is implemented in the case of all exemplary embodiments which are illustrated.

In the case of the exemplary embodiment illustrated in FIG. 4, an above-mentioned form-fit is provided both between the adapter part 5 and the coil spring interior 6, as well as between the base part 4 and the coil spring interior 6. The corresponding external thread 17 of the base part 4 in the fitted state in relation to the longitudinal sleeve axis 7 lies in an extension of the corresponding external thread 18 of the adapter part 5.

A possibility for securing the adapter part 5 to the base part 4 lies in that the adapter part 5 for fitting is connectable in a form-fitting latching manner to the base part 4. This is provided in the case of the exemplary embodiment which is illustrated in FIG. 5. To this end, the adapter part 5 can be equipped with at least one latching element 19, presently an in particular encircling latching web. By contrast, the base part 4 has two latching counterparts 20, 21, presently two in particular encircling grooves 20, 21. Upon fitting the adapter part 4, presently by length adjustment of the adapter part 4 on the base part 4, a latching connection between the adapter part 5 and the base part 4 is established by way of the latching element 19 and one of the latching counterparts 20, 21. On account thereof that the latching counterparts 20, 21, when viewed along the longitudinal sleeve axis 7, are mutually spaced apart, two latching positions of the adapter part 5 on the base part 4 and, accordingly, two dissimilar expansion positions of the adapter part 5 result.

The design embodiment of the coil spring connector 1, 2 according to the proposal, having at least two parts, allows that the base part 4 is designed from another material than the adapter part 5. In an embodiment, the base part 4 is designed from a harder material than the adapter part 5, such that the adapter part 5 in the case of a corresponding layout can mold itself into the coil spring interior 6 during fitting. In principle, the base part 4 may be a metal part, for example, in particular a casting, whereas the adapter part 5 may be a plastics part, for example.

In various embodiments, precisely one adapter part 5 which in the fitted state is disposed between the base part 4 and the coil spring interior 6 is provided. However, in order for flexibility in terms of adaptability of the coil spring connector 1, 2 to be further enhanced, it is conceivable that at least one further adapter part 5 is provided for disposal between the adapter part 5 and the coil spring interior 6.

An embodiment provides a coil spring assembly of a motor vehicle, having a coil tension spring 3 and at least one coil spring connector 1, 2 which is fitted to the coil tension spring 3. In principle, it is conceivable that the coil tension spring 3 has a coil spring connector 1, 2 according to the proposal at only one coil spring end 3a, 3b. However, presently the coil tension spring 3 has a coil spring connector 1, 2 according to the proposal at both ends 3a, 3b. Here the base part 4 is merely equipped with a hook element 22 which is indicated in FIG. 2a. Other possibilities of connectors are conceivable.

An embodiment provides the lid assembly of a motor vehicle, which is illustrated in FIG. 1. In terms of the more detailed understanding of the term "lid", reference may be made to the introductory part of the description. The lid assembly has a lid 23 which here is designed as a deck lid. The lid 23 is assigned a coil spring assembly according to the proposal, which facilitates an opening motion of the lid 23. Again, the coil tension spring 3 may be equipped with a coil spring connector 1, 2 according to the proposal at only one coil spring end 3a, 3b. However, equipping the coil tension spring 3 with a coil spring connector 1, 2 at both coil spring ends 3a, 3b is illustrated.

In the case of one embodiment of the lid assembly according to the proposal it may be provided that the coil spring assembly is a component part of a motorized drive for the motorized adjustment of the lid 23, or is at least assigned to such a drive. Here too, the coil tension spring 3 may serve as a facilitation of the opening and closing motion of the lid 23, the latter in this case being motorized.

An embodiment provides a method for fitting a coil spring assembly according to the proposal.

According to the proposal, in a first method step the adapter part 5 is fitted to the coil spring interior 6, as is shown in the transition from FIG. 2a to FIG. 2b. Subsequently, in a second fitting step the adapter part 5 together with the coil tension spring 3 is fitted to the base part 4, expanding the adapter part 5. This corresponds to the transition from FIG. 2b to FIG. 2c and to FIG. 2d.

As explained above, the first fitting step in fitting the adapter part 5 to the coil spring interior 6 in the case of all illustrated embodiments is performed by screw-fitting the adapter part 5 into the coil tension spring 3. The second method step of fitting the adapter part 5 to the base part 4 may be performed by push-fitting, press-fitting, or screw-fitting, as has also been explained.

In the case of the method according to the proposal the fact is that not only optimal adaptation of the coil spring connector 1, 2 to the coil diameter of the coil tension spring 3 is guaranteed, but that additionally a force-fit between the coil spring connector 1, 2 and the coil spring interior 6 is created during fitting.

The invention claimed is:

1. A coil spring connector for connecting in a force-transmitting manner a coil tension spring of a motor vehicle, wherein a base part for outward transmission of the spring force of the coil tension spring and a sleeve-type adapter part for fitting between the base part and a coil spring interior are provided;
   wherein by way of relative adjustment between the base part and the adapter part the base part is capable of engagement with the adapter part in such a manner that the adapter part is expanded;
   wherein the spring force is transmitted outward along a longitudinal axis of the coil tension spring.

2. The coil spring connector as claimed in claim 1, wherein the base part has a pin-type receptacle portion, and wherein the adapter part is fittable onto the pin-type receptacle portion of the base part.

3. The coil spring connector as claimed in claim 1, wherein the base part on the external side thereof, and/or the adapter part on the interior thereof, have or has, respectively, at least one in particular conical expansion portion.

4. The coil spring connector as claimed in claim 3, wherein the base part has a pin-type receptacle portion, and wherein the adapter part is fittable onto the pin-type receptacle portion of the base part, wherein the pin-type portion of the base part on the front end thereof and/or on the rear end thereof in relation to the fitting direction of the adapter part has an in particular conical expansion portion or in particular conical expansion portions, respectively, and/or wherein the adapter part at the front end thereof and/or at the rear end thereof in relation to the fitting direction of the adapter part has an in particular conical expansion portion or in particular conical expansion portions, respectively.

5. The coil spring connector as claimed in claim 1, wherein an external side of the base part and/or an interior of the adapter part are or is configured so as to be overall conical, respectively.

6. The coil spring connector as claimed in claim 1, wherein the adapter part for expandability thereof has a material weakening.

7. The coil spring connector as claimed in claim 6, wherein the material weakening comprises at least one slot or at least one elongate slot.

8. The coil spring connector as claimed in claim 1, wherein the adapter part for fitting is connectable to the base part in a form-fitting manner.

9. The coil spring connector as claimed in claim 8, wherein the base part to this end has an external thread and/or the adapter part have or has an internal thread, respectively.

10. The coil spring connector as claimed in claim 1, wherein the adapter part for fitting onto the base part is push-fittable or press-fittable along a longitudinal axis of the sleeve-type adapter part.

11. The coil spring connector as claimed in claim 1, wherein the base part has at least part of an external thread for engaging in a form-fitting manner with at least one spring turn of the coil tension spring, and/or the adapter part has an external thread for engaging in a form-fitting manner with at least one spring turn of the coil tension spring.

12. The coil spring connector as claimed in claim 11, wherein the adapter part for fitting is screw-fittable into the coil tension spring.

13. The coil spring connector as claimed in claim 1, wherein the adapter part for fitting is connectable in a form-fitting latching manner to the base part.

14. The coil spring connector as claimed in claim 1, wherein the base part is designed from another material than the adapter part.

15. The coil spring connector as claimed in claim 14, wherein the base part is designed from a harder material than the adapter part.

16. The coil spring connector as claimed in claim 1, wherein at least one further adapter part is provided for disposal between the adapter part and the coil spring interior of the coil tension spring.

17. A coil spring assembly of a motor vehicle, having a coil tension spring and at least one coil spring connector as claimed in claim 1, which is fitted to the coil tension spring.

18. A lid assembly of a motor vehicle, having a lid and a coil spring assembly as claimed in claim 17, assigned to the lid.

19. A method for fitting a coil spring assembly as claimed in claim 17, wherein initially the adapter part is fitted to the coil spring interior, and wherein subsequently the adapter part is fitted to the base part, expanding the adapter part.

20. A lid assembly of a motor vehicle, comprising:

a lid; and a coil spring assembly assigned to the lid;

wherein the coil spring assembly comprises a coil tension spring and at least one coil spring connector which is fitted to the coil tension spring;

wherein the at least one coil spring connector comprises a base part for outward transmission of the spring force of the coil tension spring and a sleeve-type adapter part for fitting between the base part and a coil spring interior;

wherein by way of relative adjustment between the base part and the adapter part the base part is capable of engagement with the adapter part in such a manner that the adapter part is expanded.

* * * * *